Figure 1:
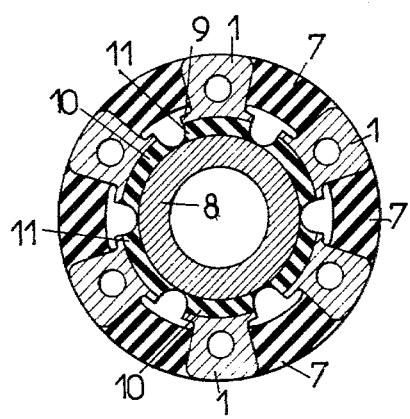

United States Patent [19]

Domer et al.

[11] 4,257,242

[45] Mar. 24, 1981

[54] RESILIENT COUPLINGS

[75] Inventors: Michel Domer, Montigny les Cormeilles, France; Eberhard Kriese, Cologne, Fed. Rep. of Germany

[73] Assignee: Hutchinson-MAPA, Paris, France

[21] Appl. No.: 11,906

[22] Filed: Feb. 13, 1979

[30] Foreign Application Priority Data

Mar. 10, 1978 [FR] France ............................ 78 07035

[51] Int. Cl.³ .............................................. F16D 3/64
[52] U.S. Cl. ...................................... 64/14; 64/27 NM
[58] Field of Search ................. 64/14, 27 NM, 96; 403/356, 358, 359

[56] References Cited

U.S. PATENT DOCUMENTS

| 2,004,299 | 6/1935 | Snyder | 64/14 |
|---|---|---|---|
| 2,200,641 | 5/1940 | Ricefield | 64/14 |
| 2,421,134 | 5/1947 | Venditty | 64/14 |
| 2,891,395 | 6/1959 | Chater | 64/14 |
| 3,411,323 | 11/1968 | Nehl | 64/14 |
| 3,500,659 | 3/1970 | Martin | 64/27 NM |
| 3,831,724 | 8/1974 | Baer | 64/14 X |
| 4,172,369 | 10/1979 | Hayes et al. | 64/27 NM X |

FOREIGN PATENT DOCUMENTS 1376646 12/1974 United Kingdom ................. 64/14

*Primary Examiner*—Henry K. Artis
*Attorney, Agent, or Firm*—Larson, Taylor and Hinds

[57] ABSTRACT

The invention concerns a resilient coupling to be placed between two shafts, of the kind comprising elastomer blocks placed between armatures disposed in a ring and belonging to two sets connected respectively to said shafts, in combination with a centering core separated from the base of the armatures by elastomer joints.

It consists essentially in locking the core rigidly to one of the shafts considered, instead of its being floating. This core, in the embodiment shown, is also locked rigidly to a part of the armatures, thus forming a star. The joints are provided between the core and horns sufficiently extended to suitably increase the angle α concerned with each joint. Other embodiments are provided in the description.

7 Claims, 6 Drawing Figures

U.S. Patent  Mar. 24, 1981  4,257,242

RESILIENT COUPLINGS

The invention relates to resilient couplings comprising, sandwiched between two flanges or sleeves cooperating with shafts or other members to be driven one by the other, a resilient system formed from elastomer blocks separating armatures fixed respectively to said flanges or sleeves, the whole in combination with a centering core which is inserted in the central part of the assembly of said armatures, which bear on the core through resilient joints.

In some of these known couplings, the joints between cores and armatures are separate from the elastomer blocks separating these latter. The assembly is fairly complex since it requires a number of joints equal to the number of blocks. Moreover, though it is true that drive is provided having a good tangential resilience, on the contrary, the radial resilience is fairly limited.

In such couplings the connection between, on the one hand, the different armatures and, on the other hand, between these latter and the core is provided by the same elastomer mass, but then the rigidity is too high. In particular the conical resilience (axial offset between the two shafts) is too low.

The present invention proposes simplifying the construction and the mounting of such couplings while still maintaining or improving their tangential resilience and axial rigidity.

According to the invention, in a resilient coupling to be inserted between two shafts or other members to be driven one by the other, of the kind comprising an elastomer block resilient system interposed in the spaces separating armatures disposed in a ring and forming two sets fixed respectively to said shafts, with furthermore a centring core connected resiliently to the armatures, said coupling is characterized by the fact that the centring core is rigidly locked to one of the shafts and that its resilient connection with the other shaft is provided by elastomer cushions placed between said core and the armatures fixed to the other shaft, these cushions being separate from the elastomer blocks separating the above-mentioned armatures.

This improvement allows, on the one hand, all the desired flexibility for transmission of the torque to be obtained and, on the other hand, a good conical resilience to be also obtained between the two shafts. It allows further the number of inner resilient cushions to be reduced.

The invention consists, apart from this main arrangement, of certain other arrangements which are used preferably at the same time and which will be more explicitly discussed hereafter, particularly:

—another arrangement according to which—more especially in combination with a coupling in which half of the armatures are connected to the centring core in the above-mentioned manner—the other armatures are themselves rigidly locked, at their periphery side, with a flange capable of being connected to the corresponding shaft.

It relates more particularly to certain modes of application, as well as to certain embodiments of said arrangements; and it relates more particularly still and this by way of novel industrial products to couplings of the kind in question comprising application of these same arrangements, as well as the special elements proper to their construction and the fixed or mobile units, particularly vehicles etc., comprising similar couplings.

It will, in any case, be well understood with the help of the complement of description which follows, as well as the accompanying drawings, which complement and drawings are of course given solely by way of indication.

Figure 2:
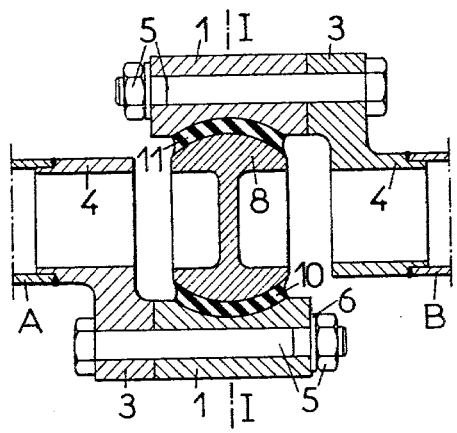

FIGS. 1 and 2 of these drawings show respectively in section through 1—1, FIG. 2, and in axial section, a coupling to be provided between two shafts, this coupling being of a known type.

Figure 3:
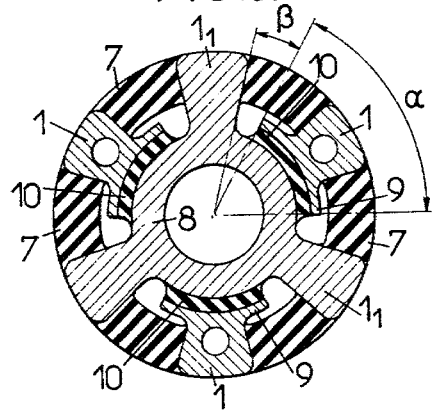
Figure 4:
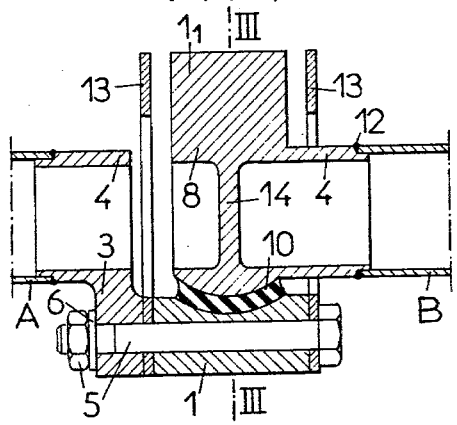
Figure 5:
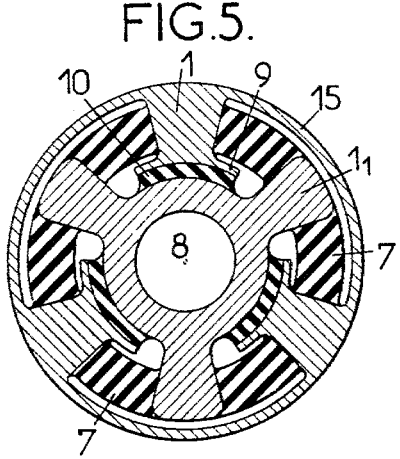
Figure 6:
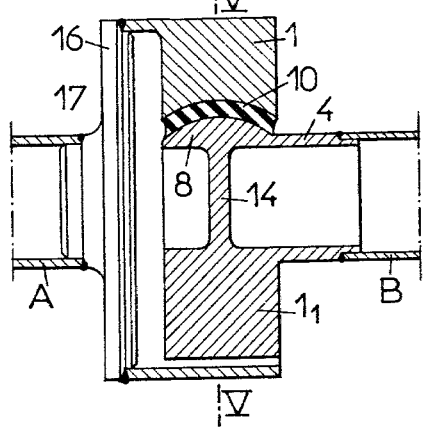

FIGS. 3 and 4, on the one hand and FIGS. 5 and 6 on the other show respectively two embodiments of a similar coupling, constructed in accordance with the present invention.

According to the invention, and more especially according to those of its mode of application, as well as according to those of the embodiments of its different parts, to which it seems preference should be given, wishing to construct a coupling of the above mentioned type between two shafts, the following or similar is the way to set about it.

To aid comprehension, there is shown in FIGS. 1 and 2 the essential members such as a coupling, of a type already known, intended for connecting two shafts A and B.

This coupling comprises for example six bosses or armatures 1 three of which are disposed for cooperating with shaft A and three others with shaft B, the two groups being imbricated. The connection between these armatures and said shafts A and B is effected by means of radial arms 3 integral with sleeves 4 to be fixed on said shafts. Arms 3 are secured to armatures 1 by means of a system of nuts and bolts 5 with washers 6. Finally, the tangential resilience is achieved by means of elastomer blocks 7 provided in the spaces between armatures 1, and bonded thereto. The whole is subjected, or not, to precompression.

For centring, a core 8 is provided with, between this latter and the bases or horns 9 of armatures 1, two sets of joints 10,11 in correspondence with the two sets of armatures 1. The core is floating.

In the embodiment of the invention shown in FIGS. 3 and 4, it is arranged for three of the armatures $1_1$, for example those disposed on shaft B side, to be rigidly locked together by means of core 8, which then assumes, with said armatures, the general shape of a star, as can be seen in FIG. 3.

It can be seen that thus we do away with three nut and bolt fixing means 5 with the corresponding washers 6, giving a great simplicity in mounting.

Furthermore, the device adopted allows the radial rigidity to be doubled for the same geometric definition and for the same elastomer, since the centring core becomes locked with one of the coupling sleeves or flanges 4, instead of being floating in the known embodiment.

There only remain three joints 10 in this case (instead of two groups 10,11), and their radial rigidity may be increased by correspondingly increasing the angle at the centre $\alpha$ of the support horns such as 9. It is sufficient to leave, of course, a suitable value for angle $\beta$ which represents the maximum tangential travel of the coupling.

It is to be further noted that, as long as the sleeve such as 4 is given a sufficient length to protect the elastomer against any overheating, assembling may be carried out by welding at 12 (FIG. 4).

In the case where it is desired to subject the elastomer of blocks 7 and/or joints 10 to precompression, there may be used, to maintain this compression obtained initially by any means known to the technique, plates or similar, such as 13, through which pass bolts 5 and which thus maintain armatures 1 (those opposite armatures $1_1$ of the star) in relative positions for corresponding with said precompression.

Said star 4, $1_1$ will be advantageously rigidified, at right angles to armatures 1, by a web 14 (FIG. 4).

According to another embodiment shown in FIGS. 5 and 6, and in particular in the case where prestressing is not desired, the three armatures 1 still remaining floating in the preceding embodiment may be formed by a fixed structure such as an outer ring 15 suitably connected to shaft 1, e.g. by means of a flange 16.

Said outer ring, which does away with the last bolts 5, may serve furthermore as a protector. It will be advantageously welded, at 17, to flange 18, providing that the welding zone is sufficiently distant from the elastomer.

This ring may furthermore be hammered out to counterbalance the contraction of the elastomer during moulding and to provide minimum prestressing of the tangential rubber blocks for transmitting the torque and considerable prestressing of the centring joints intended to ensure high radial rigidity between the two members to be coupled.

Following which, whatever the embodiment adopted, couplings can be constructed whose operation and mounting follow sufficiently from what has gone before for it to be pointless to dwell thereon, and which present, in relation to units of the kind in question already existing, numerous advantages, in particular:

a greater simplicity,
a greater ease of mounting,
a smaller number of resilient cushions,
a better radial rigidity.

As is evident and as it follows moreover already from what has gone before, the invention is in no wise limited to those of its modes of application and embodiments which have been more especially considered: it embraces on the contrary all variations thereof, particularly: those in which the number of armatures is different (e.g. four or eight) from that given solely by way of example in the drawings.

We claim:

1. A resilient coupling to be placed between two shafts or other members to be driven one by the other, of the kind comprising an elastomer block resilient system interposed in the spaces separating armatures disposed in a ring and forming two sets fixed respectively to said shafts, with furthermore a centering core resiliently connected to the armatures, characterized by the fact that the centering core is rigidly locked to one of the shafts and that its resilient connection with the other shaft is provided by elastomer cushions placed between said core and the armatures fixed to the other shaft, these cushions being separate from the elastomer blocks separating the above-mentioned armatures.

2. A coupling according to claim 1, characterized by the fact that the centering core is integral with one of the two sets of armatures of said coupling, thereby forming a star-like configuration.

3. A coupling according to claim 1 or claim 2, characterized by the fact that the cushions placed between the centering core and the armatures of one of the two sets of armatures have a spherical shape adapted to conform to the reciprocal shape of the corresponding surfaces of the core of the armatures.

4. A coupling according to claim 1, characterized by the fact that the armatures cooperating with the centering core are provided with horns for increasing the angular extent of the corresponding joints relative to the axis of the coupling.

5. A coupling according to claim 1, characterized in that the coupling comprises, on the one hand, a star-shaped device comprising at least two arms and a said centering core connected to the arms, and, on the other hand, at least two armatures, said armatures being individually disposed between said arms and connected by an outer annular girdle which is fixed to the other shaft, said armatures including horns and said coupling further comprising first and second groups of elastomer elements, elastomer elements of the first group being placed on the outside between said arms and armatures, and elastomer elements of the second group being placed on the inside between the horns included on said armatures and the centering core.

6. A coupling as claimed in claim 1 wherein one of said sets of armatures is formed integrally with an outer ring and elastomeric blocks are disposed between the armatures of said one set and armatures of the outer set, prestressing of the elastomer blocks being effected by hammering out of said outer ring.

7. A coupling according to claim 1, characterized by the fact that the centering core rigidly locked to half of the armatures, proximate of one of the shafts, and/or a transmission member connected to the other half of the armatures, proximate the other shaft, are of a length sufficient to allow their connection to the respective shafts by welding, without the heat developed during welding being able to dangerously affect the elastomer of the joints and blocks.

* * * * *